United States Patent
Ito

(10) Patent No.: US 7,142,482 B2
(45) Date of Patent: Nov. 28, 2006

(54) AUDIO DEVICE CAPABLE OF PLAYING BACK AUDIO FILES FROM A PLURALITY OF SESSIONS

(75) Inventor: Hideki Ito, Iwaki (JP)

(73) Assignee: Alpine Electronics, Inc., Tokyo (JP)

(*) Notice: Subject to any disclaimer, the term of this patent is extended or adjusted under 35 U.S.C. 154(b) by 311 days.

(21) Appl. No.: 10/057,603

(22) Filed: Jan. 24, 2002

(65) Prior Publication Data

US 2002/0101791 A1    Aug. 1, 2002

(30) Foreign Application Priority Data

Jan. 26, 2001    (JP) .............................. 2001-018376

(51) Int. Cl.
*G11B 21/08* (2006.01)
(52) U.S. Cl. ................................. 369/30.09
(58) Field of Classification Search ............ 369/30.09, 369/30.08, 30.07, 30.05, 30.19, 47.15, 47.13, 369/47.22, 47.24
See application file for complete search history.

(56) References Cited

U.S. PATENT DOCUMENTS

| | | | | |
|---|---|---|---|---|
| 5,825,726 A | | 10/1998 | Hwang et al. ................ 369/32 |
| 6,243,340 B1 | * | 6/2001 | Ito et al. .................. 369/53.19 |
| 6,363,040 B1 | * | 3/2002 | Murata ...................... 369/47.1 |
| 6,370,096 B1 | * | 4/2002 | Hashimoto ................. 369/53.2 |
| 6,442,108 B1 | * | 8/2002 | Kurihara et al. ......... 369/30.05 |
| 6,487,145 B1 | * | 11/2002 | Berhan ..................... 369/30.15 |
| 6,587,404 B1 | * | 7/2003 | Keller et al. ............. 369/30.06 |
| 6,594,214 B1 | * | 7/2003 | Misaizu .................... 369/53.11 |
| 6,621,783 B1 | * | 9/2003 | Murata ..................... 369/53.31 |
| 6,629,197 B1 | * | 9/2003 | Bhogal et al. ............. 711/111 |
| 6,631,107 B1 | * | 10/2003 | Ito et al. .................... 369/53.2 |
| 6,671,249 B1 | * | 12/2003 | Horie ....................... 369/275.3 |
| 6,680,879 B1 | * | 1/2004 | Kato et al. ............... 369/30.05 |
| 6,795,803 B1 | * | 9/2004 | Tanaka et al. ................ 703/24 |

FOREIGN PATENT DOCUMENTS

| | | | | |
|---|---|---|---|---|
| JP | 08-007539 | | 1/1996 | |
| JP | 10-283717 | | 10/1998 | |
| JP | 2001-266554 A | * | 9/2001 | .............. 369/30.09 |
| JP | 2002-170325 A | * | 6/2002 | .............. 369/30.09 |

* cited by examiner

*Primary Examiner*—Tan Dinh
(74) *Attorney, Agent, or Firm*—Brinks Hofer Gilson & Lione

(57) ABSTRACT

An audio device is compatible with a recordable medium such as a CD-R. The audio device manages track files in each session of the recordable medium and displays the session containing the file of an arbitrary track on a display. For example, each session is regarded as a virtual disk and the name of the virtual disk corresponding to the session containing the track is displayed. Accordingly, the device can be used like a CD-changer with a better operationality, and the user can easily find a desired track from the many tracks recorded on the CD-R and play it back. Also, the device automatically plays back a track of the latest session first.

14 Claims, 4 Drawing Sheets

AUDIO DEVICE CAPABLE OF PLAYING BACK AUDIO FILES FROM A PLURALITY OF SESSIONS

BACKGROUND OF THE INVENTION

1. Field of the Invention

The present invention relates to an audio device for playing back tracks recorded on a recordable medium such as a CD-R on which data is written in units of session, a method for managing the files of the tracks, and a method for playing back the tracks.

2. Description of the Related Art

By using a compression technique such as MPEG1 Audio Layer3 (MP3) or Advanced Audio Coding (AAC), a large number (one hundred or more) of tracks can be recorded on a compact disk-recordable (CD-R). Also, an audio device (hereinafter referred to also as a CD-R playback device) for playing back tracks recorded on a CD-R with the above-mentioned compression techniques is being developed.

Generally, in this type of CD-R playback device, tracks are played back in order from the track recorded first. That is, each of the tracks is managed on the basis of the file name and the timestamp (date of recording) recorded in a lead-in area of the CD-R. The CD-R playback device examines the timestamp of each of the tracks to allocate a number (hereinafter referred to as a track number) for them in order from the track having the oldest timestamp and plays back them from the first track. An operation panel of the CD-R playback device is provided with an up/down key, and by operating the up/down key, the user can start to play back the tracks from a desired track.

As described above, the known CD-R playback device plays back tracks in order from the track having the oldest timestamp. Therefore, the user is required to press the up/down key many times when he/she wants to listen to the latest track. Although the user can directly input a track number by using a ten-key keypad, it is difficult for the user to remember the track number of all of the recorded tracks because the CD-R contains 100 or more tracks.

SUMMARY OF THE INVENTION

Accordingly, it is an object of the present invention to provide an audio device compatible with a recordable medium such as a CD-R and that plays back a desired track by a simple operation.

It is another object of the present invention to provide a method for managing track files in which tracks recorded on a recordable medium such as a CD-R are managed in a user-friendly manner, and a method for automatically playing back the tracks using the method for managing track files. The audio device of the present invention comprises a display; a readout unit for reading out track files recorded on a recordable medium; and a controller which manages the track files recorded on the recordable medium in each session and which displays the session containing the file of an arbitrary track on the display.

Also, the method for managing track files of the present invention comprises managing track files recorded on a recordable medium in each session and displaying the session containing the file of an arbitrary track on the display.

Further, the method for playing back tracks of the present invention comprises managing track files recorded on a recordable medium in each session and automatically playing back the tracks in order from a track in the latest session.

In a recordable medium such as a CD-R, one session is formed every time writing is performed. A user is not conscious of a session in the known audio device. In the present invention, however, sessions are effectively used. Tracks recorded on the recordable medium are managed in each session, and the session containing the file of an arbitrary track is displayed on the display. For example, the name of the session containing the track, the track number, and the name of the track are displayed. Accordingly, the user can easily find a desired track, remembering when the track was written, or with which other track the track was written.

In this case, by regarding each session as a virtual disk and displaying the name of the virtual disk corresponding to the session, the audio device can be operated like a CD changer, and better operationality can be achieved.

DETAILED DESCRIPTION OF THE PREFERRED EMBODIMENT

Hereinafter, a preferred embodiment of the present invention will be described with reference to the attached drawings.

Figure 1:
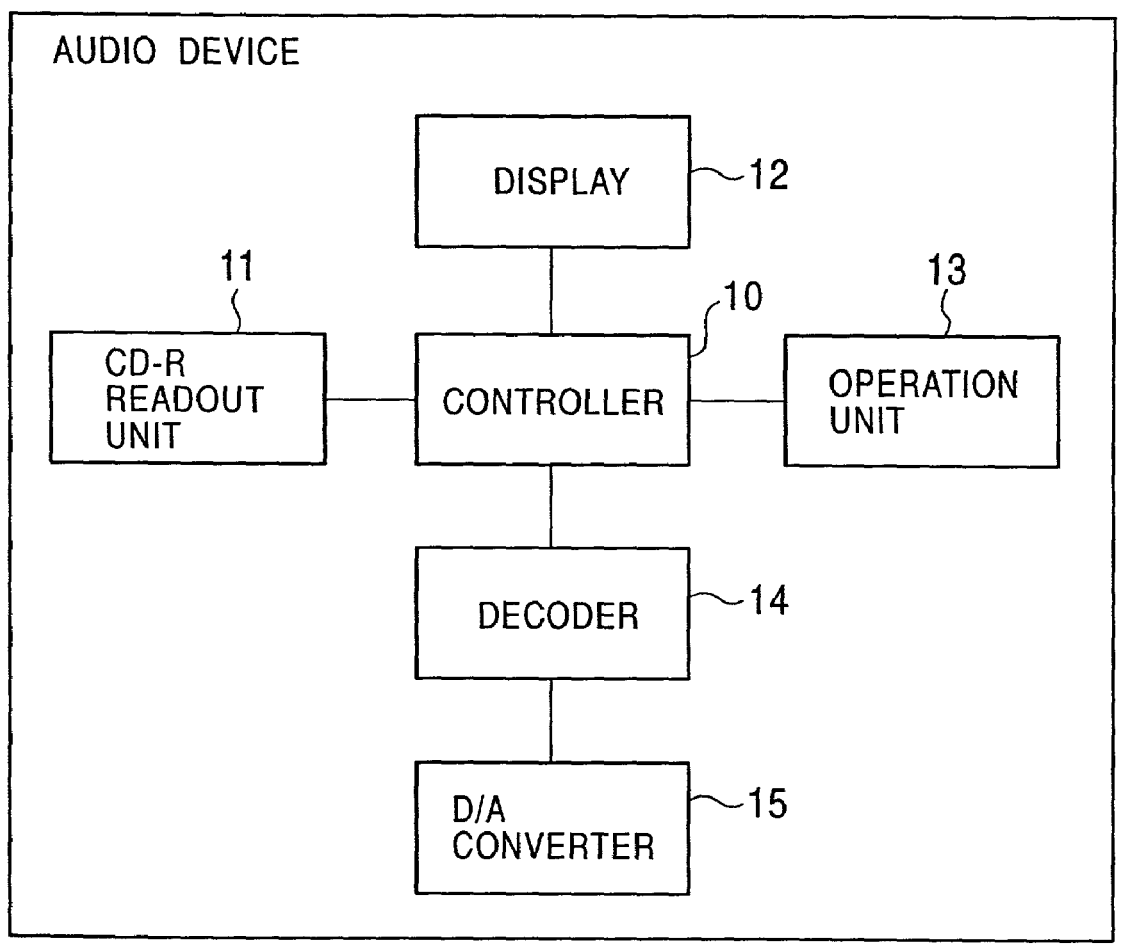
FIG. 1 is a block diagram illustrating the configuration of an audio device according to an embodiment of the present invention.
Figure 2:
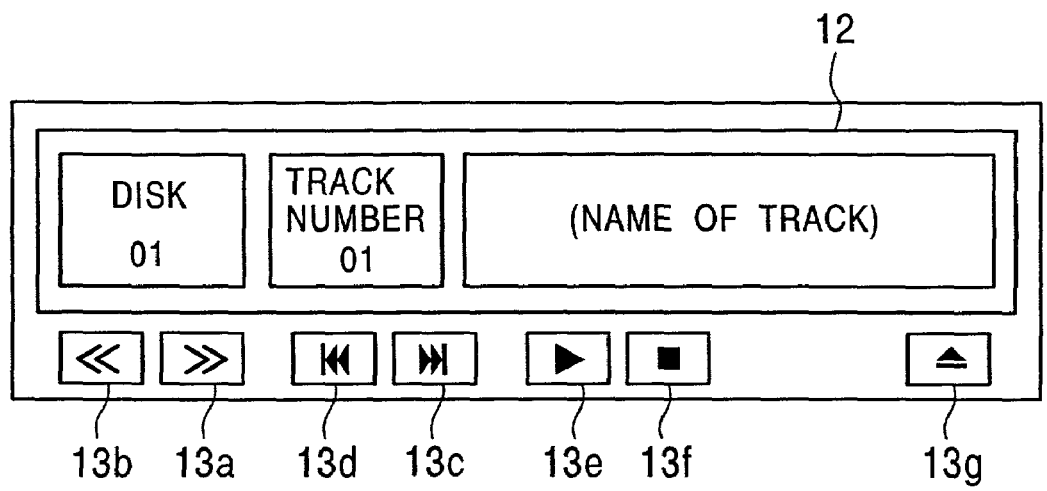
FIG. 2 illustrates an example of a front panel of the audio device.

FIG. 1 is a block diagram illustrating the configuration of an audio device according to an embodiment of the present invention, and FIG. 2 illustrates an example of a front panel of the audio device.

The audio device of the embodiment includes a controller 10, a CD-R readout unit 11, a display 12, an operation unit 13, a decoder 14, and a digital/analog (D/A) converter 15.

The controller 10 comprises a microcomputer and controls the CD-R readout unit 11 and the display 12. A disk (CD-R) containing many tracks compressed by the MP3 method is loaded in the CD-R readout unit 11. Data read out in the CD-R readout unit 11 is transmitted to the controller 10 and divided into an MP3 compressed audio signal and other data.

The display 12 includes a liquid crystal panel or the like and displays the name of the disk, the track number, the name of the track, and so forth on the basis of the signal transmitted from the controller 10. The operation unit 13 is provided with operation keys on the front panel for operating the audio device such as a next-disk key 13*a*, a previous-disk key 13*b*, a next-track key 13*c*, a previous-track key 13*d*, a playback key 13*e*, a stop key 13*f*, and an eject key 13*g*. A signal corresponding to the user's selected operation is output from the operation unit 13 to the controller 10.

The MP3 compressed audio signal output from the controller 10 is input to the decoder 14 and is output after decompressing. The audio signal after decompressing is converted to an analog audio signal at the D/A converter 15 and supplied to a speaker (not shown) via an amplifier (not shown).

Figure 3:
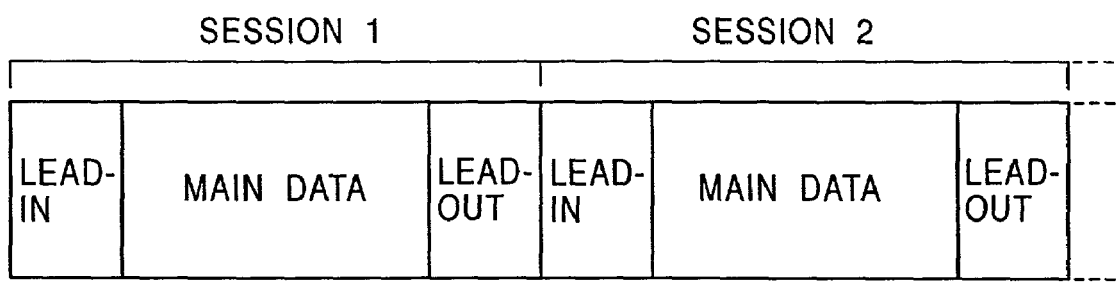
FIG. 3 is a pattern diagram illustrating the configuration of data recorded on a CD-R.

FIG. 3 is a pattern diagram illustrating the configuration of data recorded on the CD-R. In the CD-R, one session is formed every time writing is performed. The first area of each session is called a lead-in and the end area is called a lead-out. Main data is sandwiched between the lead-in and the lead-out.

Figure 4:
FIG. 4 is a pattern diagram illustrating the data configuration of an MP3 file having an ID3 tag.

In this embodiment, the main data is constituted by one or a plurality of MP3 files (track files). FIG. 4 is a pattern diagram illustrating the data configuration of each of the MP3 files. As shown in FIG. 4, in the MP3 file, additional information called an ID3 tag may be added to the compressed audio signal. Recorded on the ID3 tag is track information such as the name of the track and artist, and the genre. In this embodiment, the ID3 tag is added to each MP3 file.

Figure 5:
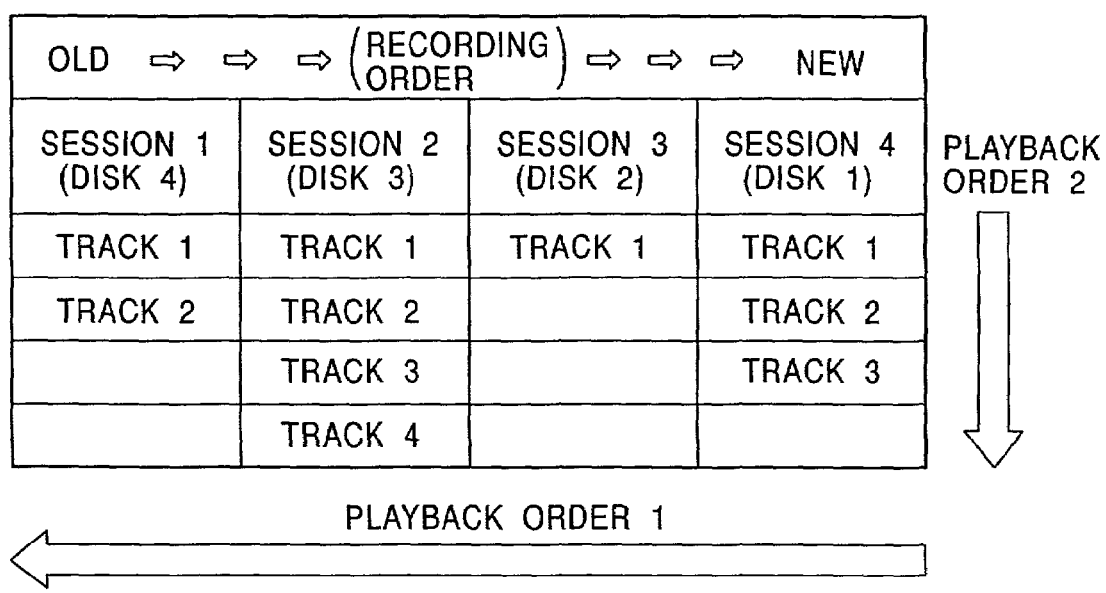
FIG. 5 is a conceptual diagram illustrating a method for managing sessions in the audio device of the embodiment.

FIG. 5 is a conceptual diagram illustrating a method for managing sessions in the audio device of the embodiment. An operation of the audio device is described with reference to FIG. 5. Herein, the CD-R includes four sessions and these sessions are formed in the following order: session 1, session 2, session 3, and session 4. That is, session 1 is the oldest and session 4 is the latest.

As the CD-R is loaded in the CD-R readout unit 11, a predetermined signal is transmitted from the CD-R readout unit 11 to the controller 10. In response to the signal, the controller 10 controls the CD-R readout unit 11 to examine the number of sessions recorded on the CD-R, the number of MP3 files contained in each session, and the name and timestamp of each of the MP3 files. Further, the controller 10 regards each session as a virtual disk and allocates a track number for the MP3 files in each session, in the order from the one having the oldest timestamp.

In an example shown in FIG. 5, session 4 is a disk 1, session 3 is a disk 2, session 2 is a disk 3, and session 1 is a disk 4. A track number (track 1, track 2, or track 3) is allocated for the three tracks in session 4 in order from the one having the oldest timestamp. Likewise, a track number is allocated for the tracks in the other sessions in order from the one having the oldest timestamp.

The controller 10 displays "01" as the name of the disk and "01" as the track number on the display 12, and reads out the name of the first track (track 1) in session 4 from the MP3 file and displays it (see FIG. 2). In this state, if the user presses the playback key 13e of the operation unit 13, the audio device plays back the tracks in session 4 from track 1 in the playback order 2 shown in FIG. 5. When all the tracks in session 4 have been played back, the sessions are changed in the playback order 1, and the tracks in each session are played back automatically in the playback order 2. The display 12 displays information about the track being played back, such as the name of the disk containing the track, and the number and name of the track.

The user can play back a track in a desired session by changing the sessions manually, by operating the next-disk key 13a or the previous-disk key 13b of the operation unit 13. Also, the user can play back a desired track in one of the sessions by changing track numbers, by operating the next-track key 13c or the previous-track key 13d.

In this embodiment, since the display 12 displays the number and name of an arbitrary track and the name of the virtual disk corresponding to the session containing the track, the user can easily find a desired track from the many tracks recorded on the CD-R and play it back. Further, the audio device of the embodiment is easy to operate because each session is regarded as a virtual disk and thus the audio device can be used like a CD changer. In addition, the audio device of the embodiment can be operated very easily when the user wants to listen from the latest track, because the audio device automatically plays back tracks in order from a track in the latest session.

Figure 6:
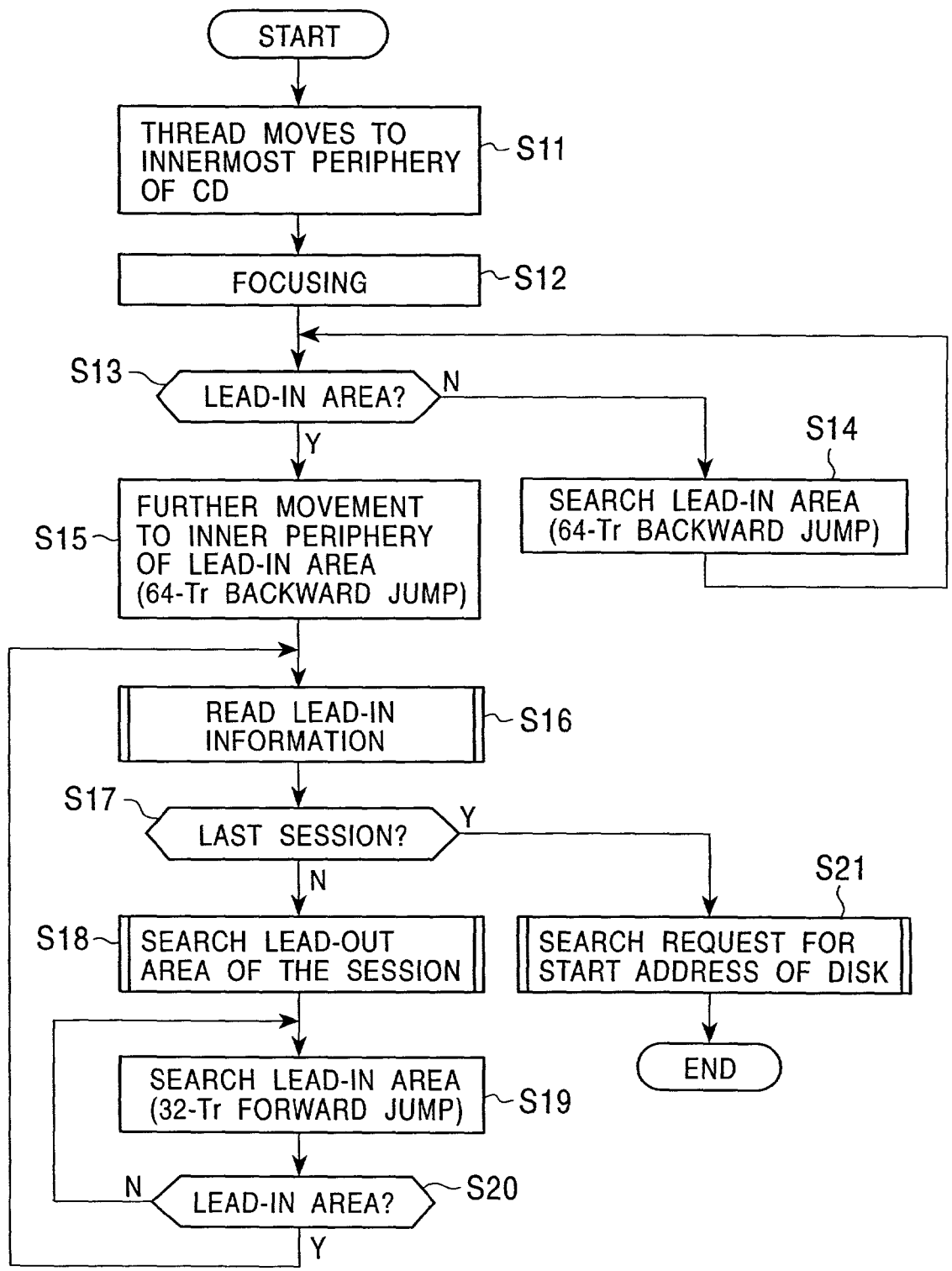
FIG. 6 is a flowchart showing a method for obtaining TOC information of a multi-session disk.

Incidentally, information such as the number of sessions and MP3 files contained in each of the sessions can be obtained from information in a Table of Contents (TOC) recorded on the lead-in area in each session of the CD-R. Hereinafter, a method for obtaining the TOC information of the multi-session disk is described with reference to the flowchart shown in FIG. 6.

First, as the disk is inserted to the CD-R readout unit 11, a thread carrying an optical pickup is moved toward the internal periphery of the disk in step S11. As the thread comes into contact with a limit switch and the limit switch is turned off, the process proceeds to step S12, the thread stops moving, and the optical pickup is focused on the data recording surface of the disk.

Subsequently, in step S13, data is read out from the disk to determine whether or not the read position of the optical pickup is in the lead-in area. If the read position is not in the lead-in area, the process proceeds to step S14 and the read position is jumped backward by 64 tracks. Then, the process returns to step S13 to determine whether or not the read position is in the lead-in area. In this way, steps S13 and S14 are repeated until the lead-in area of the first session is detected. As the lead-in area of the first session is detected, the process proceeds from step S13 to step S15 and the read position is jumped backward by a further 64 tracks.

Subsequently, the lead-in information (TOC information) is read in step S16, and it is determined whether or not it is the last session in step S17. In a single-session disk, all that is required is the reading of data of SUBQ mode 1 (ADDR1). However, a multi-session disk has to comply with SUBQ mode 5 (ADDR5) as well as SUBQ mode 1. The start address of the program area of the next session is stored in the BO pointer of the SUBQ mode 5. Accordingly, when the BO pointer is not found in the first session, it is determined to be a single-session. Also, when the BO pointer is not found in the second session or a subsequent session, that session is determined to be the last session. Further, when the start point of the next session stored in the BO pointer is "FF FF FF", the current session is determined to be the last session.

When it is determined that the session is not the last session in step S17, the process proceeds to step S18 and the lead-out area of the session is searched. After jumping forward by 32 tracks, the process proceeds to step S20 to determine whether or not the read position of the optical pickup is in the lead-in area of the next session. If the read position is not in the lead-in area, the process returns to step S19 to determine whether or not the read position is in the lead-in area after a further 32-track forward jump. In this way, a forward jump is performed by a small width of 32 tracks, and the lead-in area of the next session can be detected with certainty.

If it is determined that the read position is in the lead-in area in step S20, the process returns to step S16 and the lead-in information (TOC information) of the session is read. Then, in step S17, it is determined whether or not the session is the last session.

In this way, after detecting the number of sessions and the position of each session, the process proceeds from step S17 to step S21 to output a search request for the start address of the disk to complete reading the TOC information.

If the TOC read time is exceeded during a search of the second session or subsequent sessions, the TOC read process is completed, with only the sessions read in time being effective. The shown flowchart of a method for obtaining the TOC information is an example, and the method for obtaining TOC information is not limited to the above-described example.

As described above, according to the audio device of the present invention, track files recorded on a recordable medium are managed in each session and any track is displayed on the display so that the session including the file of the track is indicated. Thus, a desired track can be easily found and played back. In addition, by regarding each session in the recordable medium as a virtual disk, the audio device can be used like a CD changer and has better operationality.

What is claimed is:

1. An audio device for reading out track files recorded on a recordable optical disk that contains at least one session, wherein a session is formed each time writing is performed and includes one or more track files, the audio device comprising:
   a display;
   a readout unit for reading out track files recorded on the recordable optical disk;
   a controller which manages the track files recorded on the recordable optical disk in each session and which displays information regarding the file of an arbitrary track on the display; and
   an operation unit for starting playback and changing at least one of the sessions and the tracks in the sessions;
   wherein the controller regards each session as a virtual disk, allocates a track number for each of the track files in each session in order of time of recording, automatically plays back the tracks in a session in order of oldest time of recording to newest time of recording, and displays a name of the virtual disk corresponding to the session containing the file of the arbitrary track on the display, the track number of the track, and a name of the track, and the controller controls the readout unit so that a track in the track files recorded in the latest session is played back first, and sessions are changed in order of latest session to earliest session.

2. The audio device according to claim 1, wherein each of the track files includes a compressed audio signal.

3. The audio device according to claim 2, wherein the compressed audio signal is compressed by the MP3 method.

4. The audio device according to claim 1, wherein each of the track files includes a compressed audio signal, and the audio device further comprises a decoder for decompressing the compressed audio signal.

5. The audio device according to claim 4, further comprising a D/A converter for converting the decompressed audio signal output from the decoder to an analog audio signal.

6. The audio device according to claim 1, wherein the recordable optical disk is a CD-R.

7. An audio device having a CD changer, wherein the CD changer includes a next-disk key for changing from a current CD to a next CD stored in the CD changer, and a previous-disk key for changing from a current CD to a previous CD stored in the CD changer, the audio device comprising:
   a display;
   a readout unit for reading out track files recorded on a CD-R that contains at least one session, wherein a session is formed each time writing is performed and includes one or more track files; and
   a controller which regards each session on the CD-R as a virtual disk, automatically plays back the tracks in a session in order of oldest to newest, and displays the name of the virtual disk corresponding to the session containing the file of an arbitrary track on the display, wherein the controller is operable to change between sessions on the CD-R in response to a user operating the next-disk key or previous-disk key of the CD changer, and
   wherein the controller controls the readout unit so that a track in the track files recorded in the latest session is played back first, and sessions are changed in order of latest to earliest.

8. A method for managing track files recorded on a recordable optical disk that contains at least one session, wherein a session is formed each time writing is performed and includes one or more track files, the method comprising:
   regarding each session as a virtual disk, allocating a track number for each of the track files in each session in order of time of recording, automatically playing back the tracks in a session in order of oldest time of recording to newest time of recording, starting with the latest session, and changing sessions in order of latest session to earliest session;
   the method further comprising displaying a name of the virtual disk corresponding to the session containing the file of the track being played back, the track number of the track, and a name of the track.

9. A method for managing track files, comprising:
   reading out a signal recorded on a recordable medium;
   examining the number of sessions recorded on the medium, the number of track files contained in each of the sessions, and the name and timestamp of each of the track files;
   regarding each of the sessions as a virtual disk and allocating a track number for each of the track files in order from the track file having the oldest timestamp in each session to the track file having the newest timestamp in the session, automatically playing back the tracks in a session in order of oldest time of recording to newest time of recording, starting with the latest session, and changing sessions in order of latest session to earliest session;
   displaying the name of the virtual disk, the track number, and the name of the track.

10. The method according to claim 9, wherein the recordable medium is a CD-R and each of the track files is an MP3 file.

11. The method according to claim 10, wherein the number of sessions recorded on the CD-R, the number of MP3 files contained in each of the sessions, and the name and timestamp of each of the MP3 files are obtained from TOC information in the CD-R.

12. The method according to claim 9, further comprising displaying the name of a track of the latest session when the signal is read from the recordable medium.

13. The method according to claim 12, further comprising playing back first a track corresponding to the displayed name when a predetermined key is operated in a state in which the latest session is displayed.

14. The method according to claim 12, further comprising:
   playing back tracks starting from a first session containing a track corresponding to the displayed name when a predetermined key is operated in a state in which the first session is displayed; and
   playing back a track in the next session after all the tracks in the first session are played back.

* * * * *